Feb. 4, 1930.  A. H. FILANDER  1,745,665
TRUCK FOR RAILROAD CARS
Filed Dec. 17, 1928  2 Sheets-Sheet 1
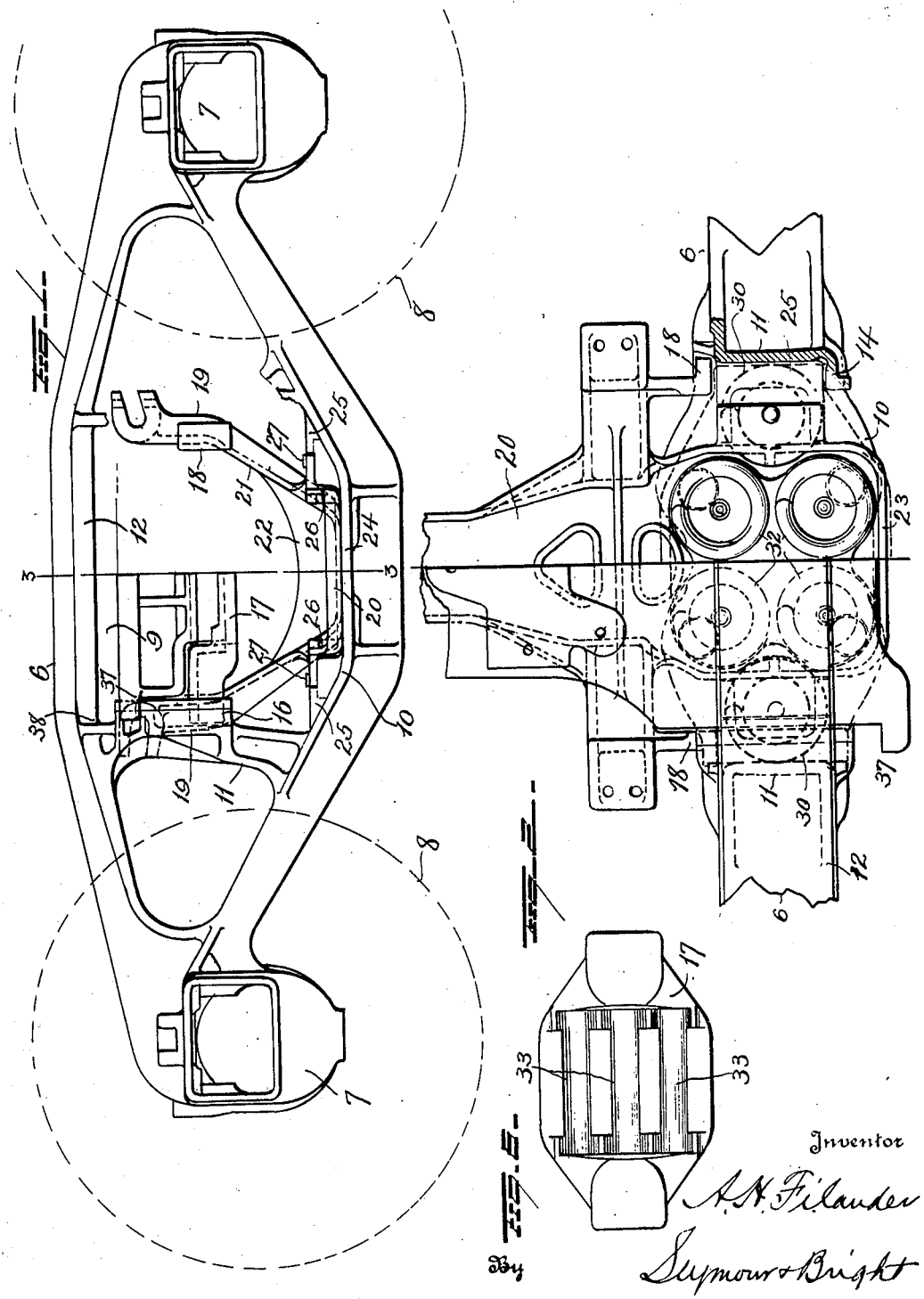

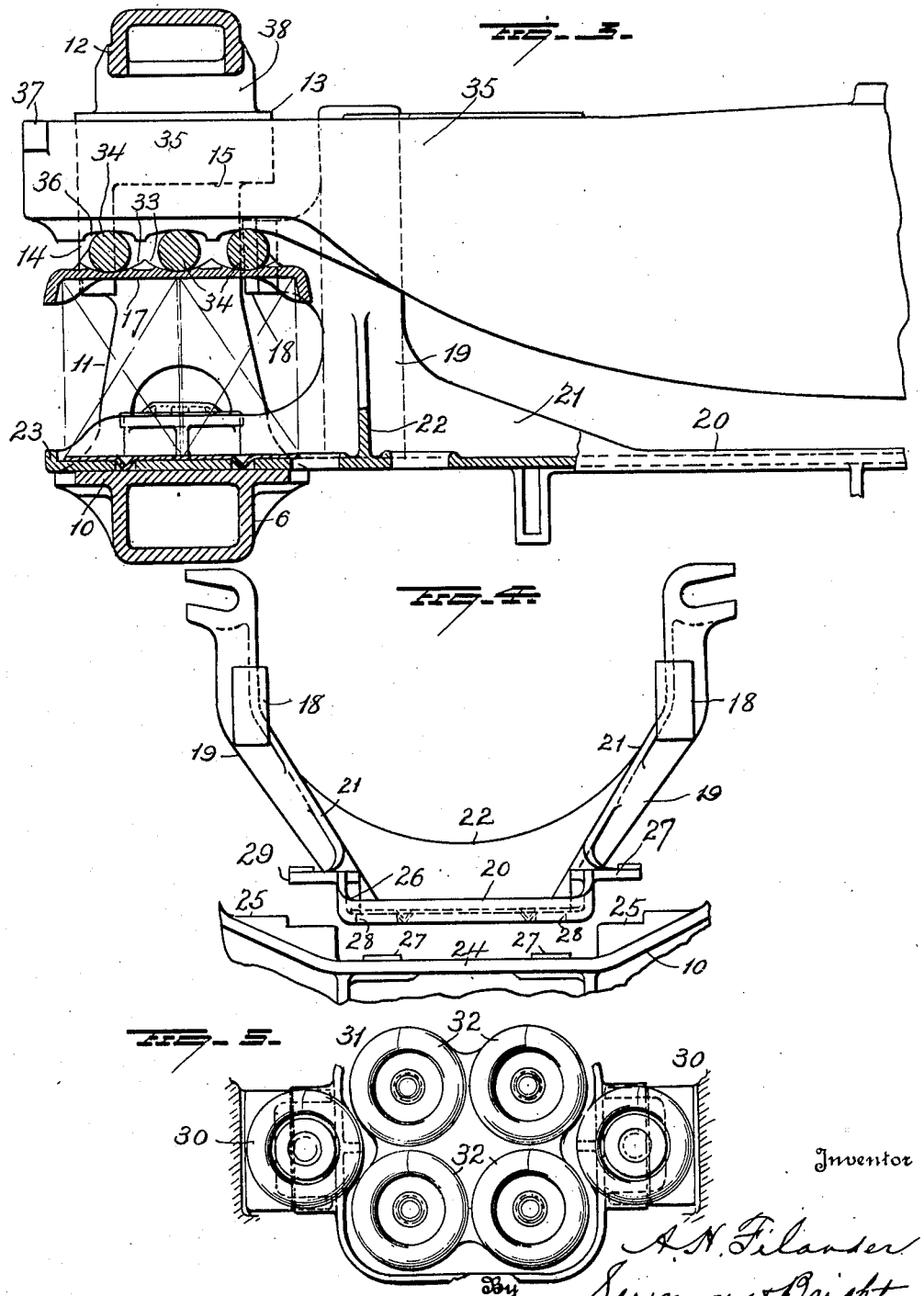

Patented Feb. 4, 1930

1,745,665

UNITED STATES PATENT OFFICE

ARTHUR H. FILANDER, OF COLUMBUS, OHIO, ASSIGNOR TO THE BUCKEYE STEEL CASTINGS COMPANY, OF COLUMBUS, OHIO

TRUCK FOR RAILROAD CARS

Application filed December 17, 1928. Serial No. 326,547.

My invention relates particularly to trucks for railroad cars, and more especially to improvements in lateral motion trucks of the "quick wheel change" type. As is well known, trucks of this character are so constructed that the side frames may be removed sidewise after the spring plank, with its superimposed parts, has been elevated sufficiently to clear its interlocking connection with the floor of the bolster opening.

When the lateral motion roller device is employed with such trucks, the roller supporting spring cap casting, must be restrained from any horizontal movement relative to the side frame if the rollers are to function properly. At the same time, such cap must be free to rise and fall with the bolster.

The primary object of the present invention is to provide a car truck of this type, in which the spring plank has brake hanger brackets provided with lugs or the like which cooperate with the side frames to form guides for the spring caps, such guides preventing undue lateral movement of the cap.

Another object is to furnish a car truck of this character, in which each side frame has horizontal guides to receive projecting lugs on the ends of the bolster, these lugs being aligned with the guides when the spring plank is elevated to a certain height, allowing the lugs on the bolster to enter the hereinbefore mentioned guides on the side frame.

A still further object is to provide a spring plank for a truck of this type, having integral brake hanger brackets and spring cap engaging abutments; the ends of the spring plank consisting of parts on two levels, made to fit and interlock with the floor of the side frame.

The invention will now be fully described in connection with the accompanying drawings, and the novel features will be clearly defined in the appended claims.

Referring to the drawings,

Fig. 1 is a side elevation of a car truck embodying my invention, with certain parts broken away to facilitate illustration, and the wheels shown in dotted lines.

Fig. 2 is a top plan view of one side of said truck, partly in horizontal section.

Fig. 3 is a transverse vertical sectional view, taken on line 3—3 of Fig. 1, and with the bolster in elevation.

Fig. 4 is an end view of the spring plank, and a fragmentary elevation of the floor of one of the side frames, and showing the spring plank in elevated position relatively to the side frame.

Fig. 5 is a top plan view of a detail, and illustrating the arrangement of the springs forming the spring cluster at each side of the truck.

Fig. 6 is a top plan view of the spring cap.

In the drawings, 6 designates one of the pair of side frames of the truck, which is preferably formed of a metal casting provided at its ends with journal boxes 7 to accommodate the axles of the wheels 8.

In the present invention, each side frame has a centrally disposed opening 9 defined by the floor 10, columns 11 and top bar 12. Each column has an angular lug 13 of substantially inverted L-shape, and these lugs project toward one another and provide vertical abutments 14 and overhanging horizontal ledges 15. The abutments 14 form outer limiting stops for end lugs 16 which extend in opposite directions from the ends of the spring cap 17. These lugs of the spring cap are prevented from moving in the opposite direction by abutments 18 which project outwardly from, and are integral with brake hanger brackets 19 on a spring plank 20 of special form. As an added burden is placed on the arms 19, due to the fact that they carry the abutments 18, such arms are reinforced by extending flanges 21 from their side edges, to the side edges of the spring plank, and for further strengthening these arms, a cross web 22 is formed as an integral part of the casting and unites the inner surfaces of the arms 19 to the bottom of the spring plank.

As is usual in trucks of this type, each extremity 23 of the plank rests on the bottom 10 of one of the side frames, and as best shown in Fig. 4, this bottom has a horizontal surface 24 which merges at its sides into step shaped lugs 25. The end of the spring plank is correspondingly shaped, and it will be noted from Fig. 4 that it has a channel shaped part 26 to extend into the recess between the lugs 25, and rest on the surface 24. This part of the plank is preferably interlocked with the side frame by means of a stud and hole connection; for example, studs 27 may project upwardly from the floor and enter holes 28 in the part 26 of the plank. Obviously, when the plank is lifted, these parts will be disengaged in order that the side frame may be detached from the plank.

As is also best shown in Fig. 4, the end of the spring plank is provided with side wings 29 that rest on the lower step of the lugs 25, and when these wings are resting on said lugs, the upper surface of the wings will be flush with the upper surfaces of the top step of the lugs. This construction allows the end springs 30 of the spring cluster 31 to rest partially on the spring plank and partially on the side frame when the plank is interlocked with the side frame. The intermediate springs 32 of the cluster are supported by the channel shaped part 26 of the plank, and all of these springs in turn carry the cap 17, which has the end lugs 16 that move vertically in the guides formed by the abutments 14 on the side frame, and the lugs 18 on the bracket arms 19.

To allow for the lateral motion heretofore mentioned, the spring cap is provided with a series of grooves 33 which limit the rolling movement of rollers 34 that rest on the cap, and support the bolster 35. The under side of the end of the bolster has similar opposing grooves 36 to accommodate the rollers.

It will be noted that each end of the bolster is provided with oppositely extending lugs or fingers 37, the ends of which are a greater distance apart than the space between the inner surfaces of the abutments 14 of the side frame, and consequently, the side frame is provided near its top with horizontal grooves 38 to permit the lugs 37 and the end of the bolster to be passed through the opening 9 of the side frame, when the latter is moved on or off the end of the bolster. Of course, when the lugs have been moved entirely through the grooves 38, and the bolster is lowered, the lugs 37 will overlap the abutments 14, (see Fig. 2) with a result that these abutment surfaces will prevent excessive lateral movement of the parts relatively to each other.

As the springs 30, 32 rest on the spring plank, the spring cap 17 rests on the springs, and the end of the bolster is supported by said cap, it will be apparent that when the plank is elevated relatively to the side frame, these parts will rise as a unit, and when they have been elevated to a height where the lugs 37 are in alignment with the grooves 38, it is apparent that the interlocking connections 27, 28 will be broken, and the parts will be in position to allow the side frame to be moved laterally off the end of the bolster, and the end of the spring plank. Of course, an opposite movement will permit the side frame to be replaced and then when the plank is lowered relatively to the side frame, the parts will assume the position shown in Fig. 3. In this position, the lugs 14 and 37 will prevent excessive lateral movement of the bolster on the rollers 34. At the same time, the side frame and the abutments 18 will prevent undue horizontal movement of the spring cap in any direction, and obviously, the stud and hole connections 27, 28 will interlock the spring plank with the side frame.

Should it be desired to remove either one or both of the side frames, to permit detachment of the wheels, lifting jacks may be engaged with the under side of the end of the spring plank for elevating the latter, and this will cause the plank, springs, spring cap, lateral motion rollers and bolster to ascend as a unit, relatively to the side frame, and manifestly, when the lugs 37 have been brought into alignment with the grooves 38, the side frame may be slipped outwardly off of the end of the cross unit.

While I have shown the abutments 18 as being mounted on the brake hanging arms 19, I desire it to be understood that such abutments may be mounted in any suitable manner on the spring plank, so long as they normally occupy the position shown in Fig. 3.

From the above description it will be apparent to those skilled in the art that numerous changes may be made in the features disclosed without departing from the scope of the annexed claims.

Having fully described my invention what I claim as new and desire to secure by Letters-Patent, is:—

1. A car truck including a side frame having an opening therein, a spring plank member and a bolster member extending into said opening, a vertically movable spring cap arranged in the opening, and means on the side frame and one of said members limiting horizontal transverse movement of said cap.

2. A car truck including a side frame having an opening therein, a spring plank member and a bolster member extending into said opening, a vertically movable spring cap arranged in the opening, means on the side frame and one of said members limiting horizontal transverse movement of said cap, and lateral motion bearings supporting the bolster on the cap.

3. A car truck including a side frame having an opening therein, a spring plank member and a bolster member extending into said opening, a vertically movable spring cap arranged in the opening, means on the side frame and one of said members limiting horizontal transverse movement of said cap, and lateral motion rollers positioned on the cap and supporting the bolster.

4. A car truck including a side frame having an opening therein, a bolster and a spring plank extending into said opening, a vertically movable spring cap arranged in the opening between the bolster and plank, and means on the side frame and plank for preventing undue horizontal transverse movement of the cap.

5. A car truck including a side frame having an opening therein, a bolster and a spring plank extending into said opening, a vertically movable spring cap arranged in the opening between the plank and bolster, brake hanger brackets carried by the plank, and means on the side frame and brake hanger brackets for preventing undue horizontal transverse motion of said cap.

6. A car truck including a side frame having an opening therein, a spring plank and a bolster extending into said opening, a vertically movable spring cap arranged between the bolster and plank, brake hanger bracket arms carried by the plank, and abutment surfaces on the side frame and said arms for preventing undue horizontal transverse motion of the spring cap.

7. A car truck including a side frame having an opening therein, a spring plank and a bolster extending into said opening, a vertically movable spring cap arranged between the bolster and plank, brake hanger arms carried by the plank, metal ribs joining the arms to the plank and reinforcing said arms, and abutment surfaces on the side frame and arms for preventing undue transverse horizontal motion of the spring cap.

8. A car truck including a side frame having an opening therein, a spring plank and a bolster extending into said opening, a vertically movable spring cap arranged between the bolster and plank, brake hanger arms supported by the plank, metallic ribs joining the arms to the plank and extending from the arms toward the medial portion of the plank, lugs supported by the arms and extending in the opposite direction to said ribs, lugs on the side frame arranged opposite to the lugs on the arms, and end extensions on the cap slidably engaging said lugs, the lugs preventing undue horizontal transverse movement of the spring cap.

9. A car truck including a side frame having an opening therein, a spring plank and a bolster extending into said opening, a vertically movable spring cap arranged in the opening between the bolster and plank, brake carrying arms integral with the plank and extending from opposite sides of the latter, a reinforcing web joining the arms and plank and extending across the latter, and abutment surfaces on the arms and side frame for preventing undue horizontal transverse movement of the spring cap.

10. A car truck including a side frame having an opening therein, a bolster and a spring plank extending into said opening, springs supported by the plank, a vertically movable spring cap supported by the springs, and on which the bolster rests, horizontal guides on the side frame, oppositely extending lugs on the bolster, capable of movement through said guides when the bolster is raised relatively to the side frame, said lugs functioning to prevent undue lateral movement of the bolster, and abutment surfaces on the spring plank and side frame for limiting horizontal transverse movement of the spring cap.

11. In a car truck, a side frame having an opening therein, a spring plank and a bolster extending into said opening, springs resting on the plank, a cap supported by the springs, rollers mounted on the cap and supporting an end of the bolster, guideways on the side frame, oppositely extending lugs on the bolster designed to work in said guideways when the side frame is being placed on or taken off of said bolster, the lugs normally preventing the side frame from moving outwardly off of the bolster, and abutment surfaces on the spring plank and side frame for limiting the horizontal transverse movement of the spring cap.

12. In a car truck, a side frame having an opening therein, the side frame having a floor defining the lower limits of said opening, a spring plank extending into said opening, a stud and aperture joint between the floor and spring plank and adapted to be disconnected when the plank is elevated relatively to the side frame, springs resting on the plank, a spring cap supported by the springs, a bolster extending into the opening of the side frame and supported by said cap, substantially horizontal guides on the side frame, lugs on the bolster movable along said guides and normally lying beneath the plane of the guides, whereby when the plank is elevated to break the connection between the plank and the side frame, said lugs are brought into alignment with said guideways, and means on the plank and side frame for limiting transverse horizontal movement of the spring cap.

13. In a car truck, a side frame having an opening therein, a bolster and a spring plank extending into said opening, means interlocking the plank with the side frame, springs and a spring cap arranged between the bolster and plank, and means on the plank for limiting transverse horizontal movement of said cap.

14. In a car truck, a side frame having an opening therein, provided with a floor having stepped lugs, a spring plank having its ends shaped to conform with said floor and having lateral extensions, the upper surfaces of which are adapted to occupy the same plane as the upper surfaces of said steps of the floor, stud and aperture connections between the floor and the spring plank, springs resting on the plank, other springs resting partially on said extensions and partially on said stepped lugs, a vertically movable spring cap supported by the springs, a bolster extending into the opening of the side frame and carried by the cap, and means for preventing undue horizontal transverse movement of the spring cap.

In testimony whereof, I have signed this specification.

ARTHUR H. FILANDER.